(No Model.) 3 Sheets—Sheet 1.
G. L. ASTON & A. HAMES.
Machine for Manufacturing Buttons.
No. 234,938. Patented Nov. 30, 1880.
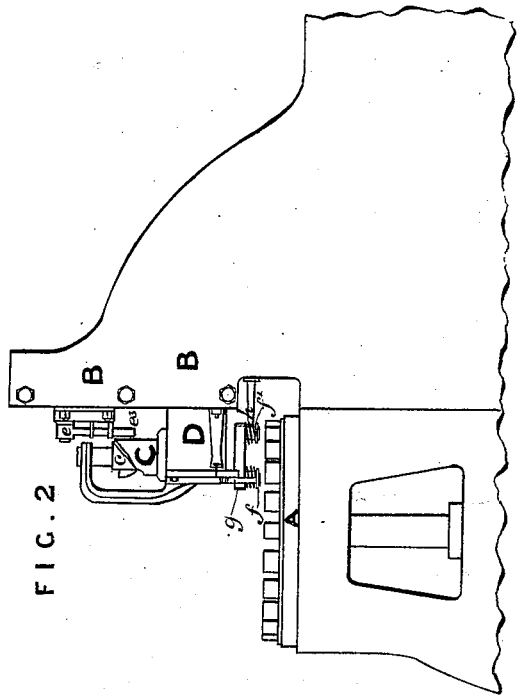
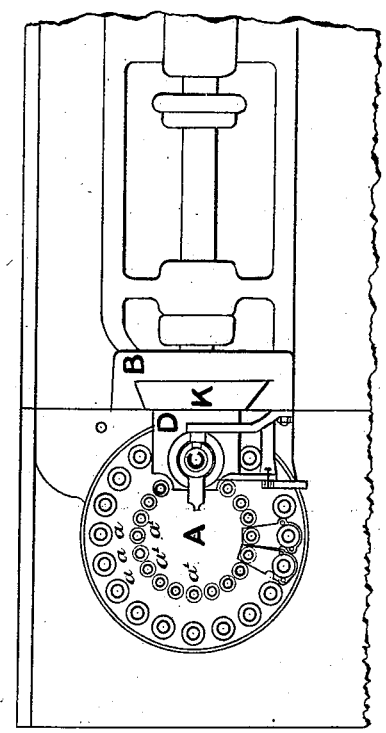
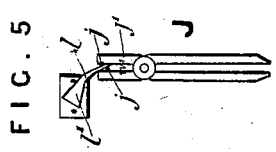
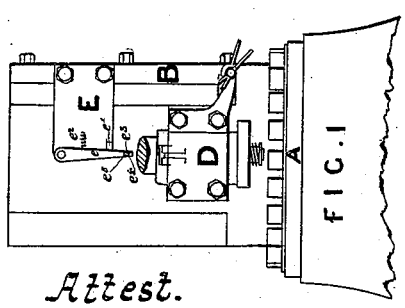
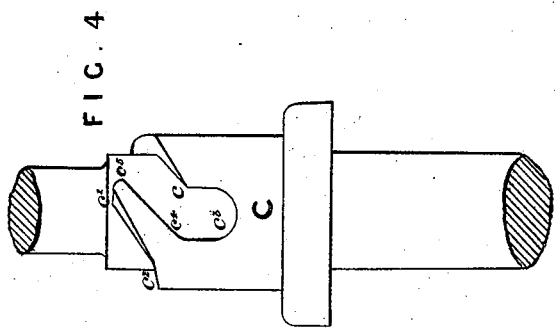
Attest.
W. A. Bertram
L. H. Barclay.
Inventors.
G. L. Aston.
A. Hames.
by
Attorney.

(No Model.) 3 Sheets—Sheet 2.
G. L. ASTON & A. HAMES.
Machine for Manufacturing Buttons.
No. 234,938. Patented Nov. 30, 1880.
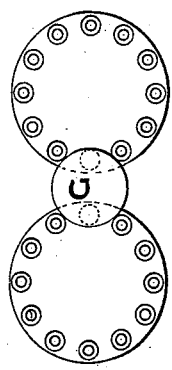
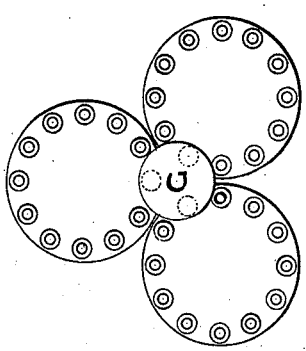
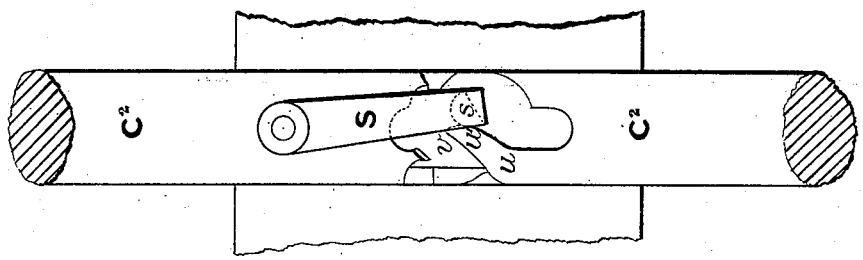
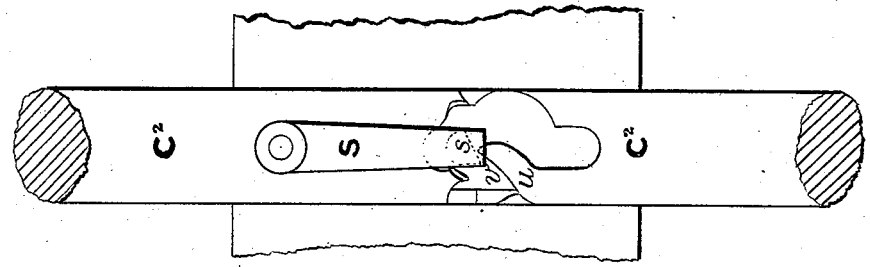
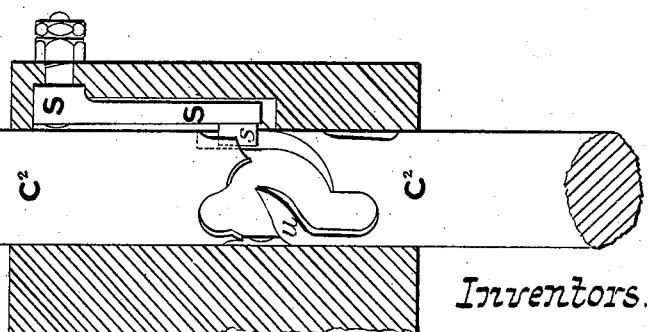
Attest.
W. A. Bertram.
L. H. Barclay.
Inventors.
G. L. Aston.
A. Hames.
by R. D. Williams
Attorney.

(No Model.) 3 Sheets—Sheet 3.
G. L. ASTON & A. HAMES.
Machine for Manufacturing Buttons.
No. 234,938. Patented Nov. 30, 1880.
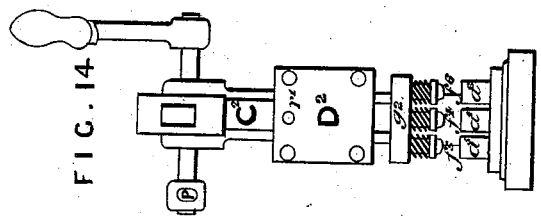
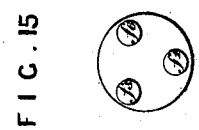
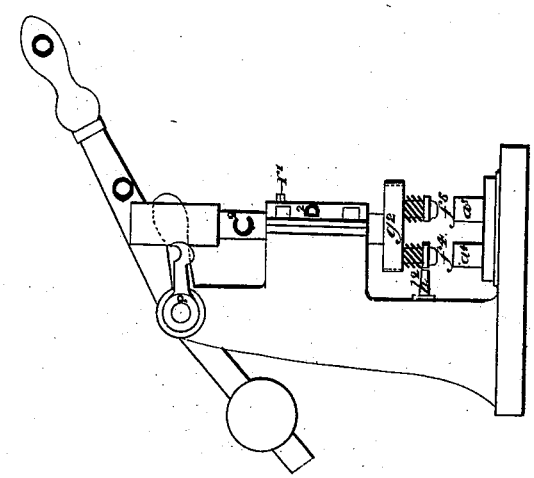
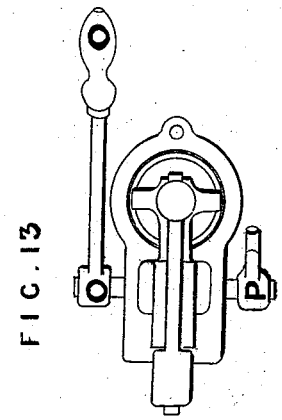
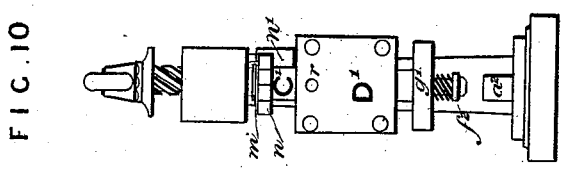
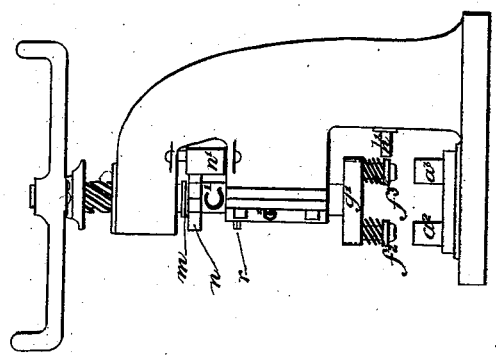
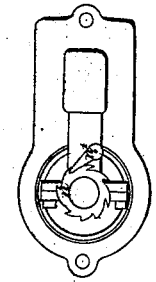
Attest.
W. A. Bertram
D. H. Barclay.
Inventors.
G. L. Aston.
A. Hames.
By R. D. Williams.
Attorney.

UNITED STATES PATENT OFFICE.

GEORGE L. ASTON AND ARTHUR HAMES, OF BIRMINGHAM, COUNTY OF WARWICK, ENGLAND.

MACHINE FOR MANUFACTURING BUTTONS.

SPECIFICATION forming part of Letters Patent No. 234,938, dated November 30, 1880.

Application filed September 13, 1880. (No model.) Patented in England March 18, 1880.

*To all whom it may concern:*

Be it known that we, GEORGE LITTLETON ASTON and ARTHUR HAMES, of Birmingham, England, have invented certain new and useful Improvements in Machinery for Manufacturing Buttons, which are also applicable to the manufacture of other articles requiring similar treatment. These improvements are fully set forth in the following specification, reference being had to the accompanying sheets of drawings.

Our invention has for its object to effect certain improvements in machinery for manufacturing buttons, which is also applicable to the manufacture of many other articles requiring similar or partly similar treatment, enabling us to increase the production of buttons or other articles from any given machine to which our invention may be applicable.

The improvements consist in attaching to a hand-press, machine-press, or a self-acting or automatic reciprocating machine a plunger, slide-disk, or cross-head carrying at its circumference or other part two or more tools for operating upon the work in hand. This plunger or slide not only reciprocates with the ordinary motion of the machine, but we impart to it a secondary series of circular halting motions—*i. e.*, the plunger or disk may turn, say, half round, then halt, then the second half and halt, or it may halt three or more times in making a complete revolution, as may be desired in designing the motion. We produce this secondary motion by forming in the plunger or slide a groove or grooves which are cut to form an incline or inclines with stopping-places, according to the number of rests required in making one revolution. A pendulous or reeling lever, slide, or other movement is provided with a suitable stud or roller to work in the groove or grooves to produce the halting movement required from the reciprocating motion of an ordinary button or other machine, as will be better understood by reference to the drawings, which we will now proceed to describe.

Figure 1 is a part front elevation, Fig. 2 a part side elevation, and Fig. 3 a part plan, of our improvement applied to the button-machine for which Letters Patent of the United States No. 228,017, May 25, 1880, were granted to us.

Sufficient only of the machine is shown to illustrate the applicability of the new motion thereto.

A is a revolving table carrying two rows of dies, $a\ a$ and $a'\ a'$. K is a slide, to which part of the new device is attached, the other part of the device being attached to the stationary head B. C is a plunger, which is free to revolve in the bearing D. E is a bracket, fast to the head of the machine, carrying the pendent lever $e$, which regulates the halting action of the plunger C in the following manner: The plunger C is provided with any desired number of grooves, $c$, according to the number of halting-places required, there being a die for each halting-place. In this case two dies, $f$ and $f'$, are shown on the plunger-disk $g$, which agree with the centers of the two rings of dies $a$ and $a'$ on the table A. The stationary bracket E carries the pendent lever $e$, which is generally held tightly against the stop $e'$ by any suitable means, such as the spring $e^2$. The end of the lever $e$ carries the stud or roller $e^3$, which enters into the slot $c$ in the plunger C, and regulates the halting action. (See Fig. 4.) Let it be supposed that the slide K has just completed its downstroke in pressing a button; then the stud $e^3$ will be over the incline of plunger C at the point $c'$, with beveled portion $e^4$ of the stud $e^3$ agreeing with the incline $c'$ to $c^2$. Now, immediately after the slide K commences to travel upward, the beveled portion $e^4$ of the stud will press upon the incline at $c'$ of the plunger C and turn the plunger just half round, bringing the die $f'$ to the position previously occupied by $f$. The stud will now be near the bottom of the slot $c^3$, so that as the plunger C moves downward the shoulder $c^4$ bears upon the curved top $e^5$ of the stud $e^3$ and moves it sufficiently sidewise to allow it to pass point $c^5$ of the incline, when the spring $e^2$ immediately brings the lever $e$ back to its position over the incline at $c'$ just as the button is being pressed. The plunger, during the process of pressing the button, is kept in its exact position by the short guide $h$, which drops into slots formed in the disk $g$.

The buttons may be lifted out of the dies, when made, by the little tongs J, which are clearly shown by Fig. 5. These tongs are brought alternately over the dies and over the basket at the side of the table by the combined action of the rollers $j$ on the fixed incline $l$. The thick part $l'$ of the incline $l$ opens the tongs and liberates the button, while the spring $j'$ recloses the tongs upon the next button to be lifted out.

Instead of using the two rows of dies $a$ and $a'$, two or more tables may be used, as illustrated by Figs. 6 and 7, where the circular disk G works partly over each table.

Figs. 8, 9, 10, and 11 illustrate our improvement as applied to a hand-press worked by a screw. The disk $g'$ in this case is shown as carrying two dies, $f^2$ and $f^3$. The corresponding dies $a^2$ and $a^3$, for receiving the material for making the buttons, are in the hand-machines, of course, stationary. As the reciprocating action of the plunger C' is accomplished by a screw through the union-joint $m$, there is a slight tendency to turn the plunger C' round at the wrong time; but this we prevent by the pawl $n'$, which takes into the ratchet-wheel $n$. The end of the bracket $h'$ guides and keeps the disk $g'$ in exact position while the buttons are pressed.

Fig. 11 is an inverted plan of the disk $g'$. The regulating-lever for producing the halting motion works in a recess inside the gland D' on the pivot $r$.

Figs. 12, 13, 14, and 15 illustrate our device as applied to the simplest form of hand or foot press. In this case there is no tendency for the plunger $C^2$ to turn round; therefore a ratchet or other equivalent device is not necessary. Three dies, $f^4$ and $f^5$ and $f^6$, are shown, with their corresponding stationary dies $a^4$, $a^5$, and $a^6$. In this press we also use a bracket, $h^2$, for guiding the disk $g^2$ with perfect certainty while the button is being pressed. O is the hand-lever, and P is the hook for attaching the foot-lever. The regulating-lever for producing the halting motion in this press also works in a suitable recess formed inside the gland $D^2$ on the pivot $r'$.

In order that the working of our improvement may be still more clearly comprehended, we have shown the plunger $C^2$ in three ways by Figs. 16, 17, and 18. Fig. 16 is a vertical section through the gland $D^2$, showing the position of the lever S in the before-mentioned recess inside the gland $D^2$. The stud or roller $s$ enters the groove in the plunger, which is in the same position, as regards the travel of the stroke, in both Figs. 16 and 17, the latter being a front view of Fig. 16. Fig. 18 shows the position of the lever as the plunger $C^2$ comes down, with one of the three projecting shoulders $u$ pressing the lever S sidewise by its round end $u'$ bearing against the stud $s$ of the lever S. As in the case of lever $e$ in drawing (Sheet 1) previously explained, immediately the plunger has traveled sufficiently downward a spring attached to the side of the lever S brings it back over the top of the incline $v$, as shown in Figs. 17 and 16. There are, of course, in this case three inclines or complete grooves, connected with each other at the upper part, so as to allow the free passage of the stud $s$ from one groove to the other by the action of a suitable spring or other equivalent device.

A sliding bolt or reeling-lever, actuated by a spring or other equivalent agent, will regulate the halting motion when applied to the plungers.

It will be apparent to any practical engineer that this motion is suitable for the manufacture of very many articles besides buttons, and is applicable to many other forms of machines, whether for making buttons or other articles, in converting a reciprocating motion into a number of circular halting motions. We would therefore have it most clearly understood that we do not confine the application of our new device to either button or any other particular class of machinery; but We do claim—

1. In combination with the revolving disk having dies $a$ $a'$, the upper dies, two or more in number, secured to the head of the plunger, to which latter a combined rotary and reciprocating motion is imparted, as and for the purpose set forth.

2. In combination with the revolving disk having dies $a$ $a'$, the upper dies, two or more in number, secured to the head of the plunger, which latter is furnished with an incline and slots, as described, and a lug or lever adapted to impart to the plunger an intermittent rotary movement, as set forth.

3. In combination with the disk having dies $a$ $a'$, the plunger C, having groove $c$, slots $c^3$, dies $f$, and lever $e$, having stud $e^3$, as set forth.

4. In combination with the disk, upper and lower dies, and grooved and slotted plunger, the lever $e$, having stud $e^3$ and spring $e^2$, as set forth.

5. In combination with the disk, upper and lower dies, and grooved and slotted plunger, and lever $e$, the guide $h$, as set forth.

6. In combination with the disk, upper and lower dies, and grooved and slotted plunger, and lever $e$, the guide $h$ and griper J, as set forth.

In testimony that we claim the foregoing as our own we affix our signatures in the presence of two witnesses.

GEORGE LITTLETON ASTON.
ARTHUR HAMES.

Witnesses:
JOHN HILL,
T. CHARLTON.